United States Patent [19]

Lowry

[11] 4,407,411

[45] Oct. 4, 1983

[54] STORAGE BOX

[75] Inventor: Alan Lowry, Canton, Mass.

[73] Assignee: Hartzell Manufacturing, Inc., St. Paul, Minn.

[21] Appl. No.: 391,549

[22] Filed: Jun. 24, 1982

[51] Int. Cl.³ .................... B65D 85/67; B65D 85/30; B65D 5/48; B65D 5/50

[52] U.S. Cl. .................. 206/387; 206/454; 206/561; 220/22; 229/15; 229/42

[58] Field of Search ............... 206/387, 310, 334, 454, 206/561; 220/22; 229/15, 42

[56] References Cited

U.S. PATENT DOCUMENTS

| | | | |
|---|---|---|---|
| 1,030,534 | 6/1912 | Pooler | 206/310 |
| 3,014,594 | 12/1961 | Kerstner | 206/334 |
| 3,756,383 | 9/1973 | Kryter | 206/387 |
| 3,938,871 | 2/1976 | Bartholomew | 206/387 |
| 4,003,468 | 1/1977 | Berkman | 206/387 |
| 4,261,464 | 4/1981 | Maitland | 206/334 |
| 4,261,465 | 4/1981 | Thomas | 206/334 |

Primary Examiner—William T. Dixson, Jr.

Attorney, Agent, or Firm—Terryl K. Qualey

[57] ABSTRACT

A storage box which can be easily modified to store flat, rectangular objects with a plurality of different widths and thicknesses is disclosed. The storage box consists of a rectangular housing member which has a plurality of straight tracks mounted on the inside surfaces of the housing ends. Two rack members may be slid into the housing along the tracks and are held in position by hooks molded into the back of the housing. Each rack member has a planar central portion with a set of ribs mounted on each side of the central portion. Within each set, the ribs are equally spaced ribs, but the spacing between the ribs differs between sets. The rack members are arranged so that when both members are inserted into the housing the spaces between the ribs form a slot into which an object to be stored may be inserted. The structure can be modified to accomodate different sized objects, such as video cartridges, by removing and reversing the rack members to change the slot thickness and by placing the members in different tracks in the housing to adjust the width of the slots.

10 Claims, 5 Drawing Figures

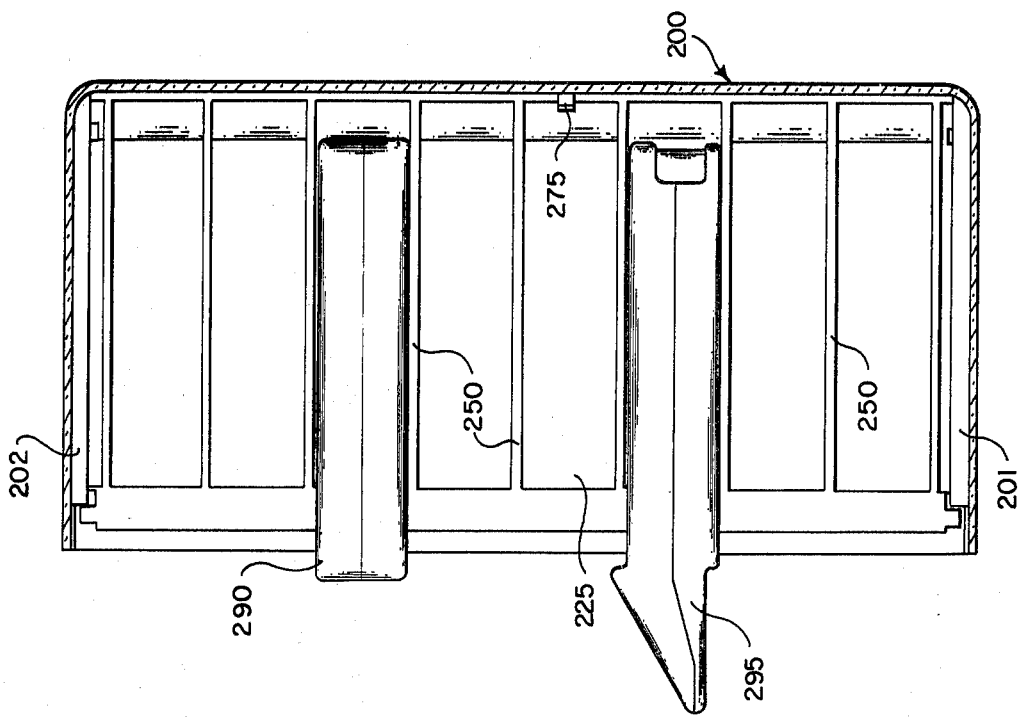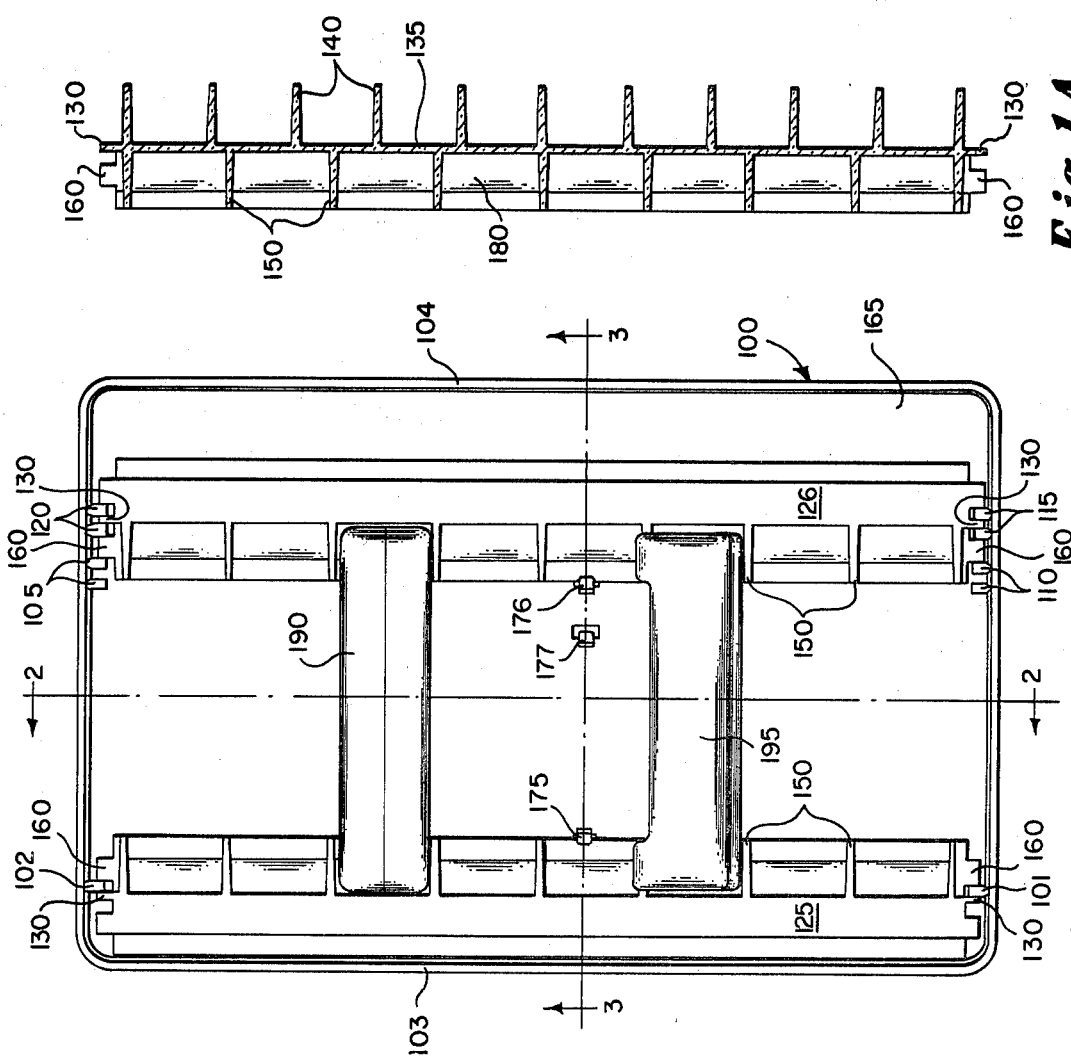

STORAGE BOX

FIELD OF THE INVENTION

This invention relates to storage devices and in particular to storage devices for holding flat, rectangular objects such as video or audio cassettes.

BACKGROUND OF THE INVENTION

Many tape recorders presently on the retail market utilize a plastic cartridge to house the recording medium. Similarly, many electronic games and other electronic equipment presently sold use a cassette or cartridge as part of the game apparatus in order to program the apparatus to play different games. Consequently, users of such electronic equipment often purchase a significant number of tape cassettes or programming cartridges in order to record different material or play several different games.

It is convenient for such equipment users to store and to display the cassettes in a storage box which is attractive, saves space and provides easy access. In the case of audio tape cassettes the sizes and shapes are fairly standard. Unfortunately, in the case of other electronic equipment, such as video games, there is no standard size or shape for the cartridges which tend to vary considerably from manufacturer to manufacturer and are not the same size as audio tape cassettes.

Prior art display and storage boxes were simply a hollow, rectangular housing having a plurality of spaced ribs defining slots mounted on the inside surface to hold the objects to be stored. However, due to the varying size and thickness of the cassettes and cartridges, a separate storage box was typically necessary for each manufacturer's line of cartridges. Since there are many manufacturers presently producing such electronic equipment, each store selling electronic equipment had to invest in a significant number of storage boxes, each suited to only one or a small number of manufacturer's cassettes and consequently of interest only to customers having such equipment.

It is therefore an object of the present invention to provide a storage box which can be easily modified to accommodate various sizes and shapes of flat, rectangular objects, such as electronic game cartridges, audio tape cassettes, or other cassettes without requiring a separate, specialized unit for each manufacturer.

It is another object of the present invention to provide a storage box which can be easily and inexpensively manufactured.

It is yet another object of the present invention to provide an easily modifiable storage box for holding a plurality of objects in a neat and attractive manner.

SUMMARY OF THE INVENTION

The foregoing objects are achieved and the foregoing problems are solved in one illustrative embodiment of the invention which comprises a rectangular, hollow housing which has a number of parallel tracks mounted on the inside surface of the ends of the housing. Two rack members can be slid into the housing along the tracks and are each held in the housing by hooks molded into the back of the housing. The spacing between the rack members can be varied by inserting them into the housing along different tracks. Each rack member consists of a planar, central divider with a set of evenly-spaced ribs mounted along each side of the member. For each rack member, the spacing between ribs differ on each side of the central divider. When two members are inserted into the housing so that ribs with the same spacing are facing each other, the ribs define a slot into a which an object to be stored can be inserted. The unit can be easily modified to accommodate objects of different thickness by removing and reversing the partition units so that ribs with different spacing are located opposite each other thereby defining a slot with a different thickness. Since only one box is necessary to hold many differently-shaped objects, manufacturing costs are lowered and retail store inventory levels are decreased.

BRIEF DESCRIPTION OF THE DRAWING

FIG. 1 is a front view of the cassette storage box showing two stored objects.

FIG. 1A is a cross section of a rack member.

FIG. 2 shows a cross section of the storage box along the line 2—2 of FIG. 1.

DETAILED DESCRIPTION OF THE INVENTION

Figure 4:
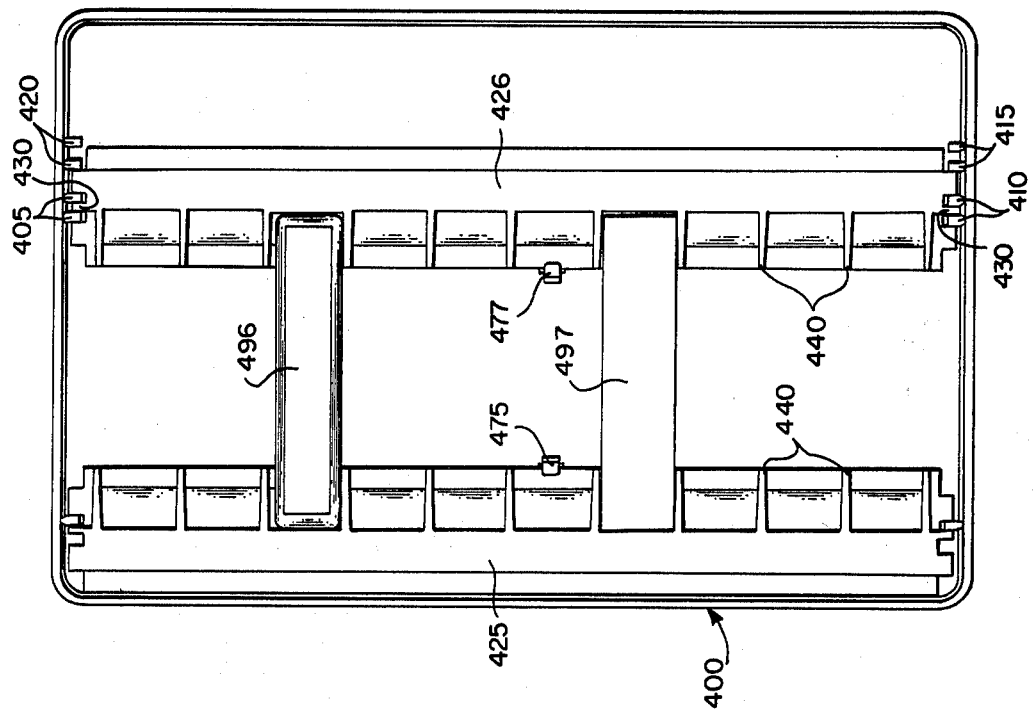
FIG. 4 is a front view of the storage box as modified to hold different-shaped objects.

An illustrative embodiment of the inventive storage box as shown in FIG. 1 comprises rectangular housing 100. Each of the Figures has been arranged with corresponding number to facilitate identification of the corresponding pieces. Housing 100 may be formed of a suitable plastic or other molding material in a well-known manner in the form of a hollow, rectangular box. Located within housing 100 are slidable rack members 125, 126 on which are mounted a plurality of ribs 150 which define the slots used to hold the stored objects, illustrated as objects 190 and 195. In order to hold members 125 and 126 in position, housing 100 is fitted with a plurality of straight line tracks designated as 101, 102, 105, 110, 115 and 120. Tracks 101 and 102 cooperate with extension 130 and tab 160 of rack member 125 to hold the member against the wall 103 of housing 100. Rack member 126 is spaced away from the wall 104 of housing 100 and, therefore, a plurality of tracks is provided in pairs, such as pairs 110 and 105, which cooperate with extension 130 on member 126 to hold member 126 parallel to member 125 at a predetermined, fixed distance. The space 165 left between rack member 126 and wall 104 can be used to hold directions, boxes etc. for the objects stored in the box.

Advantageously, according to the invention, several pairs of tracks such as pairs 105/110 and 115/120 are provided in order that member 126 may be inserted into housing 100 at different predetermined locations to allow the storage box to accomodate objects of different widths. Although in the illustrative embodiment only two sets of tracks are shown, additional sets may be provided to accommodate objects of more than two different widths.

Additionally, in accordance with the invention, members 125 and 126 may be removed from housing 100 and reinserted after rotating them 180 degrees in order to modify the slot configuration to accomodate objects of different thicknesses. In particular, as shown in cross-section in FIG. 1A, rack members 125 and 126 each consist of a central planar portion, 135, on each side of which are mounted perpendicularly, a plurality of ribs 140, 150. The ends of planar member 135 extend beyond the last rib to provide extensions 130 at either end of the rack member. Although the rib within each set 140 or 150 are equally spaced along planar member 135, advantageously, the spacing between the ribs in one set differs from the spacing of the ribs in the other set. Accordingly, the width of the slots created by the ribs may be changed depending on the orientation with which the rack members are inserted into housing 100.

As shown in FIG. 2, ribs 250 form a plurality of slots which can accomodate several objects (only two objects, 290 and 295 are shown for clarity) arranged in vertical formation.

Figure 3:
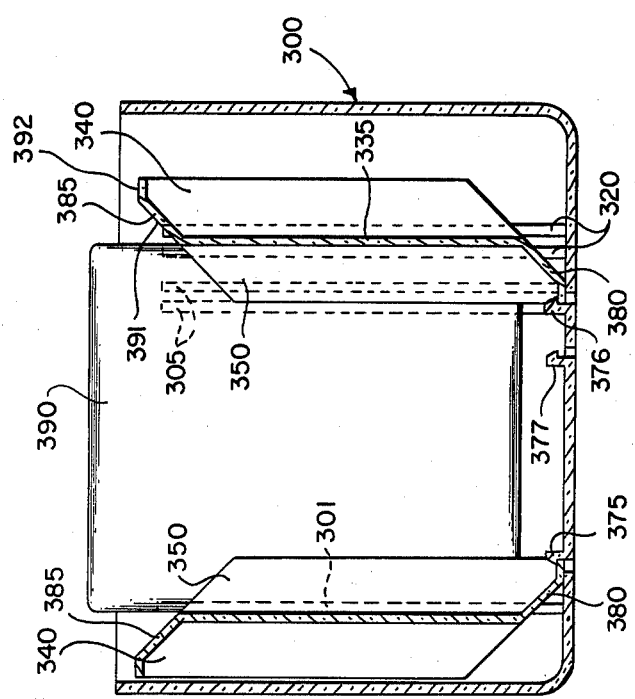
FIG. 3 shows a cross section of the storage box along the line 3—3 of FIG. 1.

The actual shape of the ribs is shown in the cross-sectional view in FIG. 3. The planar central partition 335 is connected to end caps 380 and 385, each consisting of a slanted portion, such as portion 391, and a short straight portion, such as portion 392. The slanted portion of end caps 380 and 385 not only serves to guide an object as it is being inserted into housing 300, but also serves to conceal unused set of ribs 340 to provide a more decorative and pleasing appearance.

FIG. 4 of the drawing shows the illustrative storage box with the rack members reversed from their positions in FIG. 1 in order to illustrate modification of the storage box to accommodate objects which are thinner than those illustrated in FIG. 1. In addition, FIG. 4 also illustrates a modification of the storage box to reduce the width of the storage slots. In particular, rib 430 of member 426 has been inserted into housing 400 to engage tracks 405–410 in order to accommodate cartridges 496 and 497 which have a smaller width than those previously shown.

In order to prevent the rack members from improperly falling out of the box housing as shown in FIG. 1, housing 100 is provided with a plurality of molded hooks 175–177 which can engage the lip of a rack member end cap in order to hold the rack members in the housing after they are inserted. As shown in FIG. 3, each of hooks 375–377 contains a slight lip which engages the corresponding end cap portion 380 when the cartridges are inserted. Although only one hook device is shown for each rack member location, other suitable arrangements of hooks such as pairs of hooks at each end of the rack member position may be used.

For one illustrative embodiment of the invention, typical dimensions for housing 100 are approximately 5¼ inches in width by 8¼ inches in height by 4 inches in depth. The housing is fitted with rack members having a rib spacing of ¾ inches on one side and ⅞ inches on the other side and the rack members can be positioned by tracks 101, 102, 105 110, 115 and 120 at spacings of 2¾ inches and 3¼ inches. With this arrangement, the illustrative housing may be used to store video game cartridges for games manufactured by Atari, Inc. and Odyssey, Inc. in one configuration and may be used to store video game cartridges manufactured by Mattel, Inc. and standard audio cassettes in the other configuration.

Although only one illustrative embodiment of the invention is shown, other alternatives will become obvious to those skilled in the art which embodiments are within the sprit and scope of the present invention.

What is claimed is:

1. A storage box for a plurality of flat, generally rectangular objects comprising:
    a box-like housing,
    at least two rack members slidably insertable into said housing, each of said rack members comprising a central planar portion and two sets of ribs, one of said rib sets being mounted perpendicularly on each side of said planar portion with equal spacing therebetween, said spacing of said ribs mounted on one side of said planar portion being different from said spacing of said ribs mounted on the other side of said planar portion, and
    means for mounting said rack members in spaced, parallel relationship within said housing whereby one set of ribs on one of said rack members and one set of ribs on one of said other rack members form slots for storing said objects.

2. A storage box according to claim 1 wherein said mounting means comprises means for mounting said rack members in said housing with at least two distinct spacings therebetween.

3. A storage box according to claim 2 wherein each of said said rack members has an extension mounted on both ends therof and said mounting means includes two linear tracks, each of said tracks comprising two linear ribs mounted in parallel relationship on one end of said housing and said extension slides between said linear ribs.

4. A storage box according to claim 2 wherein each of said rack members has a tab mounted on each end near said extension and said mounting means includes a single linear rib mounted on each end of said housing, said single linear rib sliding between said extension and said tab.

5. A storage box according to claim 1 further comprising means mounted on each of said rack members for hiding the set of ribs which are not used to form slots from view.

6. A storage box according to claim 1 further comprising hook means for releasably engaging said rack members to prevent said rack members from inadvertently falling out of said housing means.

7. A storage box for a plurality of flat, generally rectangular objects comprising:
    a box-like housing,
    at least two rack members slidably insertable into said housing, each of said rack members comprising a central planar portion with an extension mounted on both ends thereof and two sets of ribs, one of said rib sets being mounted perpendicularly on each side of said planar portion with equal spacing therebetween, said spacing of said ribs mounted on one side of said planar portion being different from said spacing of said ribs mounted on the other side of said planar portion, and
    a plurality of linear tracks mounted in parallel relationship on each end of said housing, said extensions of each of said rack members sliding in on of said tracks to hold said two rack members in spaced parallel relationship whereby one set of ribs on one of said rack members and one set of ribs on one of said other rack members form slots for storing said objects.

8. A storage box according to claim 7 wherein each of said rack members has a tab mounted on each end near said extension and said mounting means further comprises a single linear rib mounted on each end of said housing, said single linear rib sliding between said extension and said tab.

9. A storage box according to claim 8 further comprising means mounted on each of said rack members for hiding the set of ribs which are not used to form slots from view.

10. A storage box according to claim 9 further comprising hook means for releasably engaging said rack members to prevent said rack members from inadvertently falling out of said housing means.

* * * * *